(12) United States Patent
Soukup et al.

(10) Patent No.: US 8,341,218 B2
(45) Date of Patent: *Dec. 25, 2012

(54) TECHNIQUE FOR ENABLING A PLURALITY OF SOFTWARE COMPONENTS TO COMMUNICATE IN A SOFTWARE COMPONENT MATRIX ENVIRONMENT

(75) Inventors: Martin Jan Soukup, Ottawa (CA); Gregory Hughes, Stittsville (CA); Michael Heffernan, Ottawa (CA)

(73) Assignee: Rockstar Consortium US LP, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,375

(22) Filed: Dec. 22, 2011

(65) Prior Publication Data
US 2012/0102100 A1     Apr. 26, 2012

Related U.S. Application Data

(63) Continuation of application No. 10/224,417, filed on Aug. 21, 2002, now Pat. No. 8,086,665.

(60) Provisional application No. 60/313,990, filed on Aug. 21, 2001.

(51) Int. Cl.
*G06F 15/16* (2006.01)
(52) U.S. Cl. ......................................... 709/203; 709/217
(58) Field of Classification Search ...................... None
See application file for complete search history.

(56) References Cited

U.S. PATENT DOCUMENTS

| | | | |
|---|---|---|---|
| 6,438,594 | B1 | 8/2002 | Bowman-Amuah |
| 6,721,779 | B1 | 4/2004 | Maffeis |
| 2002/0069157 | A1* | 6/2002 | Jordan .............................. 705/37 |
| 2002/0165903 | A1 | 11/2002 | Zargham et al. |
| 2003/0187925 | A1* | 10/2003 | Inala et al. .................... 709/204 |
| 2004/0143470 | A1 | 7/2004 | Myrick et al. |

OTHER PUBLICATIONS

Advisory Action for U.S. Appl. No. 10/224,417 mailed Oct. 15, 2007, 3 pages.
Boag, S. et al., "XQUERY 1.0: An XML query language," Aug. 2002, pp. 1-43, http://wwww.w3.org/TR/xquery/.
Board of Patent Appeals and Interferences Decision for U.S. Appl. No. 10/224,417 mailed Jun. 17, 2011, 7 pages.
Box, D. et al., Simple object access protocol (SOAP) 1.1, May 8, 2000, pp. 1-35, http://www.w3.org/TR/SOAP/.
Christensen, E. et al., Web services description language (WSDL) 1.1, Mar. 15, 2001, pp. 1-52, http://www.w3.org/TR/wsdl.
CORBA, "OMG/ISO Standards," Sep. 17, 2001, pp. 1-2, http://www.corba.org/standards.htm.
CORBA, "Welcome to the OMG's Cobra Website," accessed Nov. 5, 2002, pp. 1-2, http://www.corba.org.

(Continued)

*Primary Examiner* — Peling Shaw
(74) *Attorney, Agent, or Firm* — Withrow & Terranova, PLLC

(57) ABSTRACT

A technique for enabling a plurality of software components to communicate in a software component matrix environment is disclosed. In one particular exemplary embodiment, the technique may be realized by a method for enabling a plurality of software components to communicate in a software component matrix environment comprising the steps of encoding a request at a client side; communicating the request to a server at a server side via a communication interface; comparing the request to a plurality of operations supported at the server side; determining whether a function match exists at the server side; and returning a response comprising the function match to the client side in response to the request via the communication interface wherein the response is mapped to a data model of a client.

19 Claims, 5 Drawing Sheets

OTHER PUBLICATIONS

Demichiel, L., "Sun Microsystems Enterprise Java Beans Specification," Version 2.1, Aug. 2, 2002, 639 pages.
Examiner's Answer to Appeal Brief for U.S. Appl. No. 10/224,417 mailed Aug. 27, 2008, 15 pages.
Final Office Action for U.S. Appl. No. 10/224,417 mailed Jun. 20, 2007, 15 pages.
JAXM, "Java API for XML messaging (JAXM)," Oct. 24, 2002, 2 pages, http://java.sun.com/xml/jax/.
JAXP, "Java API for XML processing (JAXP)", Aug. 5, 2002, 1 page, http://java.sun.com/xml/jaxp/index.html.
JAXB, "Java architecture for XML binding (JAXB)," Aug. 5, 2002, pp. 1-2, http://java.sun.com/xml/jaxb/index.html.
Non-final Office Action for U.S. Appl. No. 10/224,417 mailed Mar. 20, 2006, 10 pages.
Non-final Office Action for U.S. Appl. No. 10/224,417 mailed Sep. 18, 2006, 13 pages.
Notice of Allowance for U.S. Appl. No. 10/224,417 mailed Aug. 22, 2011, 11 pages.
XML-QL, "A query language for XML, XML-QL," Version 0.9, Accessed Nov. 5, 2002, 1 page, http://www.research.att.com/sw/tools/xmlql/.

* cited by examiner

TECHNIQUE FOR ENABLING A PLURALITY OF SOFTWARE COMPONENTS TO COMMUNICATE IN A SOFTWARE COMPONENT MATRIX ENVIRONMENT

CROSS-REFERENCE TO RELATED APPLICATIONS

This application is a continuation of U.S. patent application Ser. No. 10/224,417, entitled, "A Technique for Enabling a Plurality of Software Components to Communicate in a Software Component Matrix Environment," filed Aug. 21, 2002, now U.S. Pat. No. 8,086,665, which claims priority to U.S. Provisional Patent Application No. 60/313,990, entitled "An N by M Software Component Matrix Communication Mechanism," filed Aug. 21, 2001, which are each hereby incorporated by reference herein in their entirety.

FIELD OF THE INVENTION

The present invention relates generally to software component communication and, more particularly, to a technique for enabling a plurality of software components to communicate in a software component matrix environment.

BACKGROUND OF THE INVENTION

In the current state of the art, there is no mechanism for enabling a large number of software components to communicate efficiently, regardless of different versions and capabilities. The compatibility of software components (or applications) to communicate across multiple platforms and versions, with differing data models generally requires building or implementing a specific interface for every communication channel between two software components. However, this current solution is not cost efficient and is overly burdensome. Other technologies involve detecting version incompatibility. However, sufficient mechanisms for forming meaningful communications across multiple versions has not been realized in an efficient manner.

In essence, current technologies have not yet addressed the ability to have any component talk to any component and be able to understand bits and pieces of what it is saying, and to achieve this without significant process or memory overhead.

In view of the foregoing, it would be desirable to provide a technique for enabling a plurality of software components to communicate in a software component matrix environment which overcomes the above-described inadequacies and shortcomings. More particularly, it would be desirable to provide a technique for enabling a plurality of software components to communicate in a software component matrix environment in an efficient and cost effective manner.

SUMMARY OF THE INVENTION

According to the present invention, a technique for enabling a plurality of software components to communicate in a software component matrix environment is provided. In one particular exemplary embodiment, the technique may be realized by a method for enabling a plurality of software components to communicate in a software component matrix environment comprising the steps of encoding a request at a handler at a client side; communicating the request to a server at a server side via a communication interface; comparing the request to a plurality of operations supported at the server side; determining whether a function match exists at the server side; and returning a response comprising the function match to the client side in response to the request via the communication interface wherein the response is mapped to a data model of a client.

In accordance with other aspects of this particular exemplary embodiment of the present invention, the function match is an exact match; the step of determining whether a function match exists further comprises the step of filtering at least one association associated with the request wherein the function match is a close match to the request; the step of determining whether a function match exists further comprises the steps of calling a general query and implementing a generic interface when no function match exists; wherein a generic data structure abstracts an interface from the client side for inserting at least one capability into a generated application program interface object wherein the object possesses one or more of an event auto-registration function and an event auto-trigger function; wherein a data rate produced across the communication interface is optimized by an iterator; wherein a cache on the client side comprises a configurable persistent write through buffer allowing at least one change on one of the client side and the server side to be reflected on both the client side and the server side; the method further comprises the step of implementing an auto server location algorithm for locating the server and determining a communication interface type; and wherein the request is in extensible markup language.

In accordance with further aspects of this particular exemplary embodiment of the present invention, a computer signal embodied in a carrier wave readable by a computing system and encoding a computer program of instructions for executing a computer process performing the method recited in above.

In accordance with still further aspects of this particular exemplary embodiment of the present invention, a system for enabling a plurality of software components to communicate in a software component matrix environment comprises a handler for encoding a request at a client side; and a server object for communicating the request to a server at a server side via a communication interface, comparing the request to a plurality of operations supported at the server side, determining whether a function match exists at the server side, and returning a response comprising the function match to the client side in response to the request via the communication interface wherein the response is mapped to a data model of a client.

In accordance with additional aspects of this particular exemplary embodiment of the present invention, the function match is an exact match; at least one association associated with the request is filtered wherein the function match is a close match to the request; a general query is called and a generic interface is implemented when no function match exists; a generic data structure abstracts an interface from the client side for inserting at least one capability into a generated application program interface object wherein the object possesses one or more of an event auto-registration function and an event auto-trigger function; the system further comprises an iterator for optimizing a data rate produced across the communication interface; the system further comprises a cache on the client side comprising a configurable persistent write through buffer for allowing at least one change on one of the client side and the server side to be reflected on both the client side and the server side; and wherein implementing an auto server location algorithm is implemented for locating the server and determining a communication interface type.

In accordance with further aspects of this particular exemplary embodiment of the present invention, an article of manufacture for enabling a plurality of software components to communicate in a software component matrix environment comprises at least one processor readable carrier; and instructions carried on the at least one carrier; wherein the instructions are configured to be readable from the at least one carrier by at least one processor and thereby cause the at least one processor to operate so as to: encode a request at a client side; communicate the request to a server at a server side via a communication interface; compare the request to a plurality of operations supported at the server side; determine whether a function match exists at the server side; and return a response comprising the function match to the client side in response to the request via the communication interface wherein the response is mapped to a data model of a client.

In accordance with still further aspects of this particular exemplary embodiment of the present invention, wherein the request is in extensible markup language.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

By allowing applications to talk to each other and simplifying development of interfaces, the present invention significantly reduces amount of manpower required to deploy and integrate new network management applications. The present invention is applicable to all forms of distributed communication, including network management.

According to an embodiment of the present invention, the present invention provides a communication mechanism where any software component can communicate effectively with any other component in an efficient manner where processing overhead is reduced. In the description that follows, the term server refers to a software component that receives requests, sends responses to those requests and/or sends event notifications. The term client refers to a software component that makes requests, receives responses to those requests and/or receives event notifications.

Figure 1:
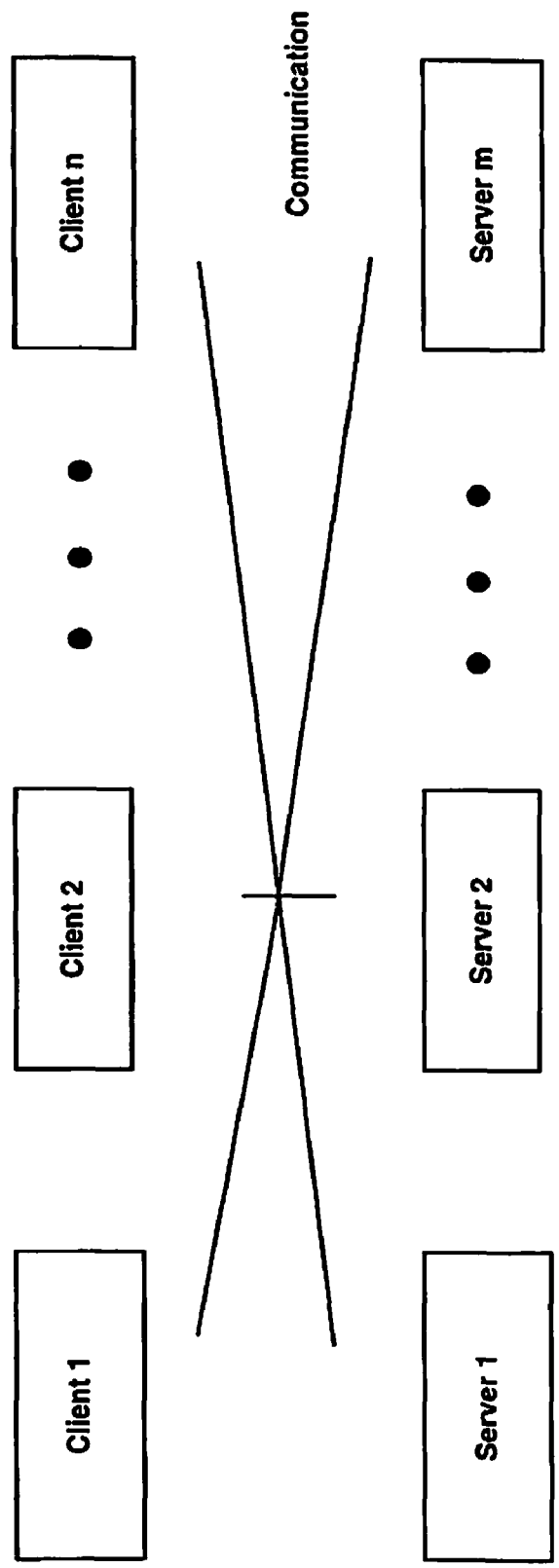
FIG. 1 is a system supporting software component communication in a matrix environment in accordance with the present invention.

FIG. 1 illustrates a system supporting software component communication in a matrix environment in accordance with an embodiment of the present invention. In this system, software components may communicate in a matrix environment, regardless of different versions and disparate communication mechanisms. Multiple layers may exist, where some components may assume both a client and server role. As illustrated, Client 1 may communicate with one or more of Server 1, Server 2 and Server m, regardless of versions and capabilities.

Figure 2:
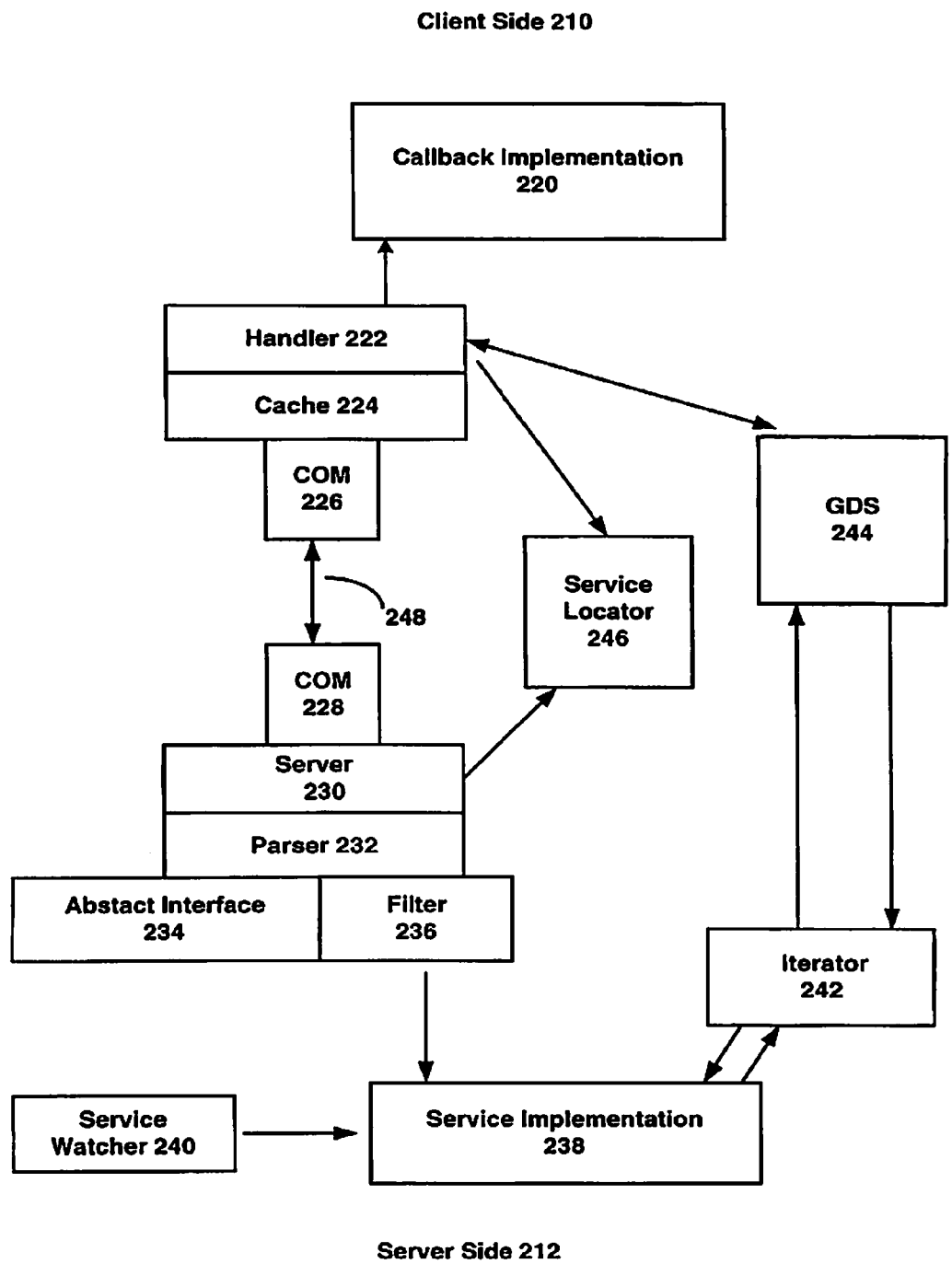
FIG. 2 is a general architecture of a software component communication mechanism in accordance with the present invention.

FIG. 2 is a general architecture of a software component communication mechanism, according to an embodiment of the present invention. In this exemplary illustration, only one service interface is shown. However, multiple interfaces may be implemented depending on particular applications. Server side service objects may include server 230, parser 232, abstract interface 234 and filter 236 at server side 212. Server side server objects may be in communication with server implementation 238, which may contain code specific to a particular server at server side 212. Client side objects may include handler 222 and cache 224. Client side objects may be in communication with callback implementation 220, which may contain code specific to a particular client at client side 210.

Generic capabilities may include communication (COM) objects 226 and 228 for providing a functional interface 248. Additional communication capabilities may be supported by communication objects. Other generic capabilities may include service locator 246 and service watcher 240, for example. Service locator 246 provides a service directory that enables a client to locate a particular service by name or other identifiers. Service watcher 240 may be in communication with service implementation 248 for providing security and performance features during a chaos situation or other type of error.

Auto generated general-purpose capabilities may include a generic data structure (GDS) 244 and iterator (e.g., an auto-chunking iterator) 242. GDS 244 may be in communication with handler 222 on a client side and in communication with iterator 242. Iterator 242 may be in communication with service implementation 238 and GDS 244. Iterator 242 may be provided for optimizing data rate produced across interface 248. Auto-generated APIs allow the abstraction (e.g., hiding) of distribution (or distributed) communication, service location/resolution, service version and service capability, for example. Therefore, the problems of distributed communication between components may be hidden from a programmer (or other user). This auto generation may be based on an XML defined mapping between object models. While meta-data may be useful, an auto-binding of object models through loose mechanisms of the present invention provides rapid deployment of performance applications with no or little concern for different internal object models.

According to an embodiment of the present invention, for each or a plurality of services installed, a handler 222 on a client side 210 may be paired with a server 230 on a server side 212. These handler-server object pairs may communicate through a central (possibly static) pluggable communication interface between COM object 226 and COM object 228. An auto server location algorithm may be implemented to locate one or more servers for client side 210 and determine the type of communication for one or more servers that the handler 222 is trying to communicate with. The auto server location algorithm may further provide downloading of new communication technologies, for example. Examples of services may include events, queries (e.g., read operations) and updates (e.g., write operations) and other services.

Interface 248 between handler 222 and server object 228 may be a functional interface with reads and writes, for example, as function calls from the client side 210 to the server side 212. Events in a push model may be from the server to the client. In a pull model, events may originate from the client to the server.

An auto generated object Application Programming Interface (API) or GDS 244 may communicate directly with handler 222 on the client side 210 or on the server side 212. GDS 244 may abstract an interface of one or more services from the user (e.g., client). In addition, an auto generation process may insert capabilities into generated API objects. For example, these objects may have an ability to auto-register for events so these objects are kept up-to-date in a local cache. Further, these objects may have an ability to auto-trigger events on write operations in the server. For example, when an object is retrieved by a client from a server (in response to a request), the object may self-register itself for changes initiated on that object by the server and may automatically send changes back to the server in the case where the object is changed by the client.

Functional requests may be encoded as Extensible Markup Language (XML) requests 248 by handler 222 and responses (e.g., objects, basic data types, or sequences of data types) may also be encoded in XML. Functions on the server side 212 may then be translated from XML back into named function calls. Abstract interfaces 234 implemented by the server may be called as well. Abstract interfaces 234 may provide for XML defined mapping between objects thereby allowing for rapid deployment of performance applications with no or little concern for different internal object models.

On the client side, a cache 224 may be provided to understand auto-registration of objects. Without re-requesting the objects (or even a portion of the objects), the objects remain up-to-date in cache 224. Cache 224 may also implement a persistent write through buffer that may be configurable. Cache 224 may allow larger data sizes to be handled without having to make requests remotely multiple times.

Figure 3:
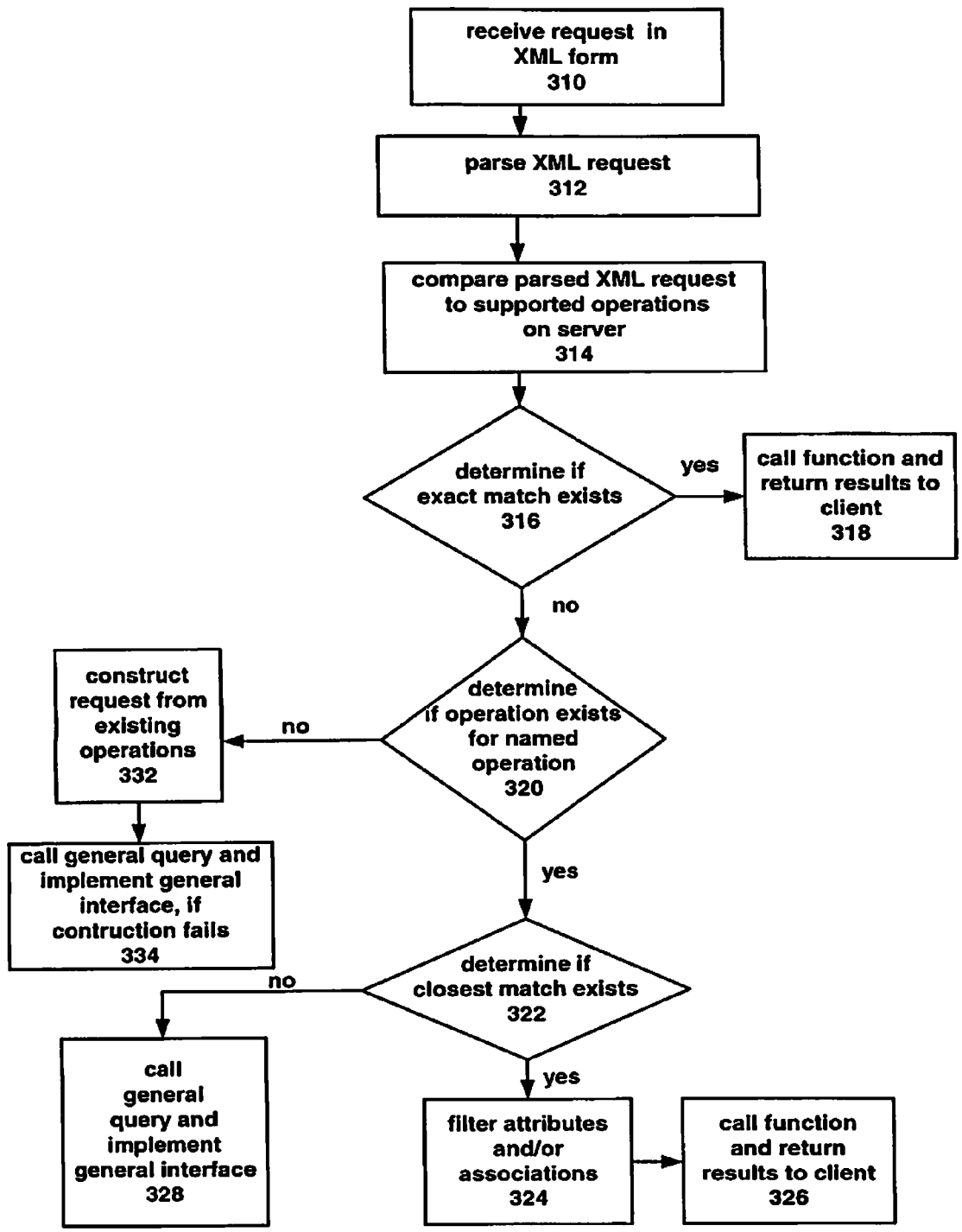
FIG. 3 is a flowchart illustrating a method for enabling software component communication at a server side in accordance with the present invention.

FIG. 3 is a flowchart illustrating a method for enabling software component communication at a server side in accordance with the present invention. On the server side 212, a request in XML form may be received at step 310. At step 312, the XML request may be parsed. At step 314, the parsed XML request may then be compared to supported operations on the server. At step 316, it may be determined whether an exact match exists. If an exact match is found, that function is called and the results are returned, after being XML encoded, to the client, at step 318. At step 320, it may be determined whether an operation exists for a named operation for the service but where filtration is not supported so full syntaxes are not handled in a function in the server. If the full syntax is supported, the full request may be served through a construction of a set of existing operations, at step 332. A general query may be called and a general interface may be implemented, if the construction fails, at step 334.

At step 322, a closest match to an original request may be called. At step 324, attributes and/or associations which have not been included in a call may be automatically filtered by service filter 236 through knowledge of the data model on both sides. For example, a client may request a service to be executed (e.g., query, write, etc) and request the results to be filtered before being returned. The filter service must have knowledge of an object model (GDS) used on each side of the communication interface for this filtration to be meaningful. Some filtration may be done automatically since, for instance, portions of the data resulting from the request may not exist in the client data model, and thus do not need to be transferred.

If a match to the named query does not exist, a general query may be called and a general interface may be implemented at step 328. In this case, a parsed tree of the query may be passed in and the server may be responsible for implementing this kind of generic interface by abstract interface 234, for this service. If the request is not supported and can not be constructed from existing operations, a possibly pre-processed representation of the request may be passed to an optional implementation of an interface in the server. If this interface is implemented by the server implementation this implementation is responsible for attempting to interpret the meaning of the request.

By knowing a meta-data description of a target object model, including default values, only information in which the client is interested is returned while other data may be stripped from the response during XML encoding. The XML encoded response when received by handler 222 may be decoded. The appropriate objects are then returned to the client side 210. Also, since each service is a pair of handlers 222 and servers 230 and is independent of the other services, the handler-server pair may be installed without other services. Therefore, an embodiment of the present invention provides a pick and chose Application Programming Interface (API) where interface meta-data may negotiate what services are available and what communication type to use for each service. In general, this principle provides for an installation of needed (or desired) services where their existence may be advertised through meta-data of a service location mechanism.

An embodiment of the present invention uses code auto-generation, as illustrated by 244, to maximize speed of construction and customization while providing consistent tested interfaces. Interface capability and data model specifications may be described in standard XML and may be used as a variable input to an auto-generation process. These specifications may also be used to generate interface meta-data, which may be used in an exchange during initialization of versioning information between components, as well as to generate test harnesses to exhaustively verify functional implementations of component interfaces. An exchange of meta-data additionally allows a traversal of unknown data types and use of unknown capabilities without recompilation on both sides of the interface. By specifying a meta-data description of an interface capability and that of a data model used in information exchanges separately, graceful version degradation is possible (e.g., service reconstruction, display of new/old attributes/objects, composition of old/new attributes from a set of new/old attributes, etc.).

Different communication classifications including, but not restricted to, External Data Representation (XDR), Remote Method Invocation (RMI), Java™ Messaging Service (JMS), Transmission Control Protocol/Internet Protocol (TCP/IP) and queries, operations, and events when provided as independent services, may use different communication mechanisms for each service on a server (e.g., the same server, different servers, etc.). In addition, services may be hot swapped or plugged, after which a meta-data exchange may reflect a component's new capabilities. This separation of each service into a description as a separate capability allows versioning and maintenance of services independent of each other, while minimizing process overhead of applications that may only be interested in some subset of the available services provided by such a tool.

To provide greater simplification of a communication interface, some or all communication mechanisms may be hidden behind an object-oriented API. The API, which may be auto-generated from a data model XML description, requires no or little knowledge of a distributed programming paradigm may be required. For example, some knowledge of a data model on both sides of the interface may be required. The communication mechanisms hidden behind this API may then be made pluggable and hot swappable, so that component administrators, programmers or other users may decide which communication mechanisms to use. Further, the introduction of new communication technologies does not effect existing software components.

A feature of an embodiment of the present invention may include service auto-location, as provided by Service Locator 246, which may be based on an ability to understand the communication mechanism used by a server, for a specific service. The service auto-location feature may also download (and use, etc.) relevant communication technology if such is not available on the client. In addition, an available server supporting one of the communication mechanisms currently supported by the client may be chosen.

If a client makes incorrect requests or has an error, this may cause significant or even fatal load on the server. To alleviate this problem, a mechanism called server throttling may be used. This function may be provided by service watcher 240. Server throttling allows a server administrator or programmer to set limits on memory usage, process time available and/or other factors for serving of a request from a client.

Figure 4:
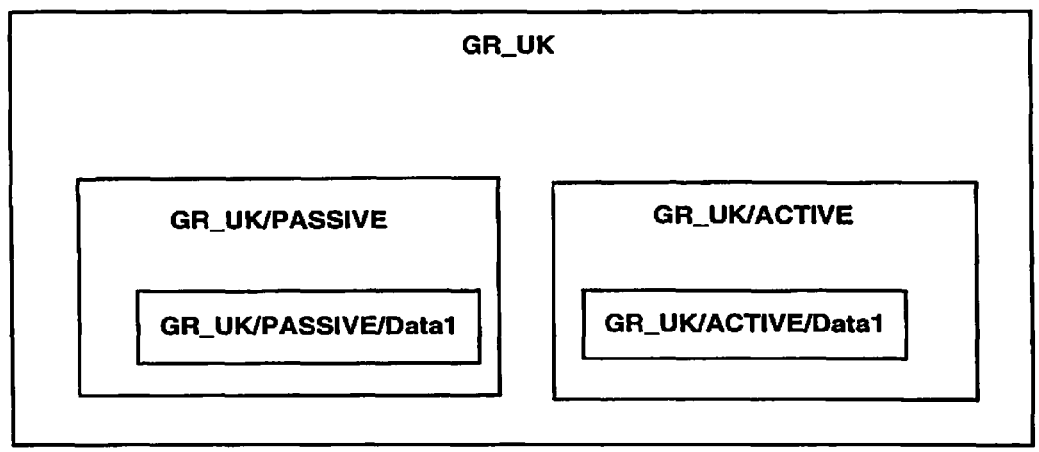
FIG. 4 is an illustration of a hierarchy of names in accordance with the present invention.

FIG. 4 is an illustration of a hierarchy of names (or addresses) in accordance with the present invention. In this example, two objects named Data1 exist. Through hierarchical name resolution a correct source may be found for the datum. More importantly, if GR_UK/ACTIVE/Data1 has a reference to GR_UK/PASSIVE/Data1, it may be located without complicated queries or table storage regarding contents of all available servers. Thus, naming may be related to data source and data composition. In this example, GR_UK is the data source.

In a distributed component environment, resolution of resources, especially redundant resources, is extremely useful. A trader or registry may provide resolution of a resource name. A trader may include a central server that provides location of a named object.

As shown in FIG. 4, containing a data object's resource name hierarchically within its own unique identifier provides optimized, abstract resource discovery. As a result, the system may be configured to work across multiple redundant components invisibly to the user. In addition, data federation may be achieved without additional communication overhead.

An embodiment of the present invention is directed to minimizing communication between software components. As a significant portion of the code that a component programmer(s) sees is auto-generated, objects may be configured to automatically register themselves for event notifications. Further, a class may statically register for addition events on that object type and may therefore automatically handle a set of predetermined events and important (or "hot") changes in the server interface. A programmer may further "plug-in" code to generated objects to handle event extensions. For example, events to notify changes in an object's state may be a result of a state change in the object. Objects in a system may be configured to automatically trigger a modification event upon a successful state change from the client.

Large efficiency gains in computation time and communication delay minimization may be achieved by an event and query filtration, as illustrated by filter 236. This may be provided by a query language mechanism that translates to object calls. Named queries may be provided based on a retrieval of each object type described in a component's data model. In addition, filtration language allows results of these queries to be filtered by filter 236 and may also include additional information not in a server's model, such as summarization, correlation, amalgamation, pre-processing of data and insertion of required data through processing of existing data, etc.

Event subscription may be based upon similar concepts so that a mechanism for reducing event notifications may be provided. Automatic filtration provided by service filter 236 may be provided when the server does not deem the specific implementation of the filtered query as necessary or efficient for an interface. In addition, filters may provide for chronological analysis, for instance, where only one event of a particular type is sent per minute (or other time period). This analysis of type may be considered object class or instance or even object attribute based.

It is important to provide for load restriction on a component due to requests from other components. Filtering and processing capabilities may potentially allow a client to send a server into an endless process or exceed available resources. To alleviate this concern, servers may be configured to restrict memory usage, process time allowed for a request, resource handlers (e.g., file, network, etc.), threads, etc. as provided by service watcher 240. In addition, server components may configure a number of simultaneous requests to process before queuing. For example, some server components may wish to process some or all requests in their own threads immediately upon receipt, while some server components may wish to process requests in a single threaded fashion. By providing these mechanisms, resilience of the server component is maintained without requiring a server component programmer to implement complicated queuing mechanisms.

According to an embodiment of the present invention, a query language mechanism provides post-filtering capabilities, optimizing data access and distributed communication. In addition, this mechanism enables XML query strings to be reconstituted into function calls where capabilities are explicitly implemented by a server component. This provides implementation simplicity and potential to provide a more highly optimized and efficient system. By using a hashed set of named queries, whose number is relatively small, and comparing Binary Decision Diagram (BDD) parsed filters for equivalence, a match (or reconstruction) may be determined in a trivial amount of time. In addition, any efficient knowledge representation mechanism may be used. Therefore, when mixed with a query filtration, a server component programmer (or other user) only needs to implement a very small amount of functionality to provide a wide variety of services to a client component.

Figure 5:
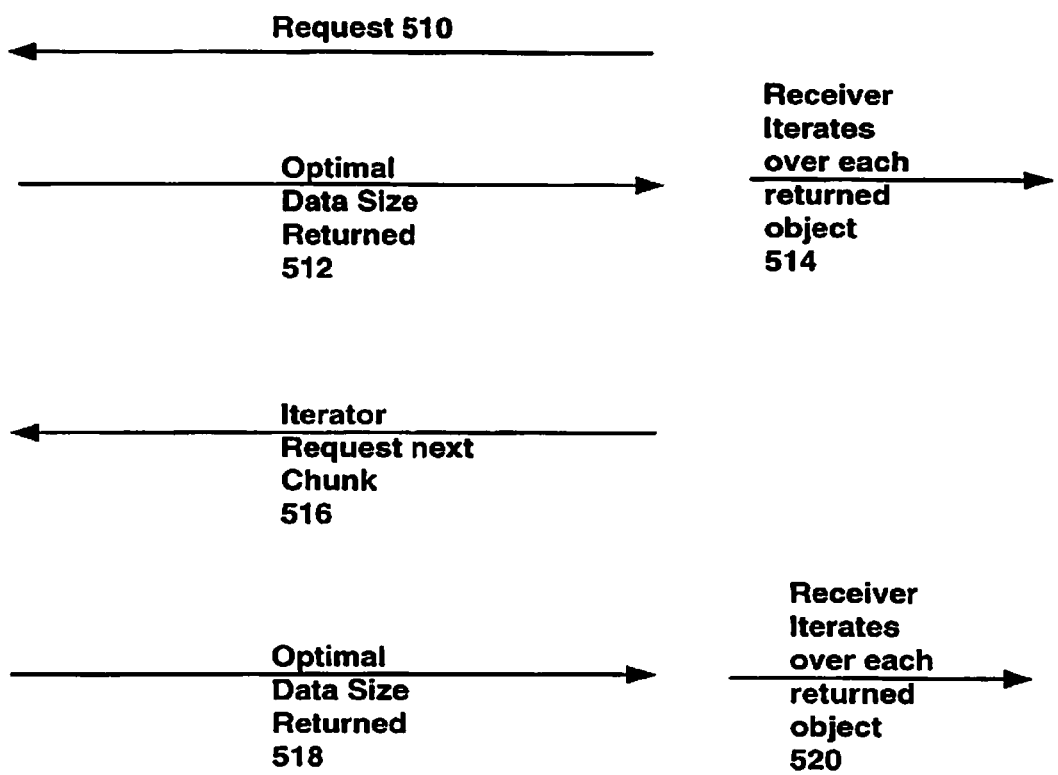
FIG. 5 is an example of an auto-chunking iterator in accordance with the present invention.

FIG. 5 is an example of an auto-chunking iterator in accordance with an embodiment of the present invention. In response to a request 510, an optimal data size (or less) may be returned via 512. When a consumer (or user) of this data has iterated through all available objects as shown by 514, an iterator may make a request for a next chunk of data via 516. An optimally sized data may be returned by 518. A receiver may then iterate over each returned object as shown by 520, and so on.

Certain data sizes per transfer maximize total average data throughput rate. However, this parameter varies from system to system and is subject to change as a system evolves over time. In order to use an optimal data size at any given time, components may detect optimal transfer sizes for a host environment (and communicating neighbor) and tune transfers to that size. This means that object iterators may transfer an optimal data size set at any given instant, returning an object at a time to a requesting application and retrieving a next chunk of data from a server component when cached data is exhausted. This procedure may be performed by auto-chunking iterator 242.

A significant overhead involved in various processes involves decoding of XML strings (encoding is almost imperceptibly fast). To ensure viability, software components may be provided with a high-performance XML codec (coder/decoder). This codec may be based on a character pointer look-ahead algorithm with no storage or sorting of tags. Transmission schema definition may stipulate strict rules of order in message contents, allowing XML strings to be parsed in a Finite State Machine (FSM) based paradigm. The looseness of schema definition means that great flexibility of data is possible while XML syntax remains simple, regardless of the complexity of an interface.

At this point it should be noted that enabling a plurality of software components to communicate in a software component matrix environment in accordance with the present invention as described above typically involves the processing of input data and the generation of output data to some extent. This input data processing and output data generation may be implemented in hardware or software. For example, specific electronic components may be employed in a software component or similar or related circuitry for implementing the functions associated with enabling a plurality of software components to communicate in a software component matrix environment in accordance with the present invention as described above. Alternatively, one or more processors operating in accordance with stored instructions may implement the functions associated with enabling a plurality of software components to communicate in a software component matrix environment in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method of enabling a plurality of software components to communicate in a software component matrix environment, the method comprising:
   receiving, at a server side via a communication interface, an encoded request from a client side;
   comparing the encoded request to a plurality of operations supported at the server side;
   determining a function match at the server side; and
   returning, to the client side via the communication interface, in response to the encoded request, an encoded response comprising results of the function match, wherein the encoded response is mapped to a data model of a client at the client side.

2. The method of claim 1, wherein determining the function match comprises determining an exact match to the encoded request.

3. The method of claim 1, wherein determining the function match comprises determining a closest match to the encoded request.

4. The method of claim 3, wherein returning the encoded response comprises filtering the results of the function match based on the data model of the client and returning the encoded response comprising the filtered results.

5. The method of claim 1, wherein determining the function match comprises calling a general query and implementing a generic interface when no function match is found.

6. A computer-readable non-transitory storage medium containing instructions for enabling a plurality of software components to communicate in a software component matrix environment, the instructions comprising instructions executable:
   to receive, at a server side via a communication interface, an encoded request from a client side;
   to compare the encoded request to a plurality of operations supported at the server side;
   to determine a function match at the server side; and
   to return, to the client side via the communication interface, in response to the encoded request, an encoded response comprising results of the function match, wherein the encoded response is mapped to a data model of a client at the client side.

7. The medium of claim 6, wherein the instructions executable to determine the function match comprise instructions executable to determine an exact match to the encoded request.

8. The medium of claim 6, wherein the instructions executable to determine the function match comprise instructions executable determine a closest match to the encoded request.

9. The medium of claim 8, wherein the instructions executable to return the encoded response comprise instructions executable to filter the results of the function match based on the data model of the client and returning the encoded response comprising the filtered results.

10. The medium of claim 6, wherein the instructions executable to determine the function match comprise instructions executable to call a general query and to implement a generic interface when no function match is found.

11. A server for operation in a software component matrix environment, the server comprising:
    a communication interface operable to receive an encoded request from a client side;
    a service parser operable:
       to compare the encoded request to a plurality of operations supported at a server side; and
       to determine a function match at the server side; and
    a service server operable to return, to the client side via the communication interface, in response to the encoded request, an encoded response comprising results of the function match, wherein the encoded response is mapped to a data model of a client at the client side.

12. The server of claim 11, wherein the service parser is operable to determine the function match by determining an exact match to the request.

13. The server of claim 11, wherein the service parser is operable to determine the function match by determining a closest match to the request.

14. The server of claim 13, further comprising a service filter operable to filter results of the function match based on the data model of the client, the service server being operable to return the encoded response comprising the filtered results.

15. The server of claim 11, wherein the service parser is operable to determine the function match by calling a general query and implementing a generic interface when no function match is found.

16. A method of enabling a plurality of software components to communicate in a software component matrix environment, the method comprising:
- encoding a request at a handler at a client side;
- communicating the encoded request to a server at a server side via a communication interface; and
- receiving, via the communication interface, an encoded response comprising results of a function match, wherein the encoded response is mapped to a data model of a client at the client side.

17. The method of claim 16, further comprising caching the results of the function match.

18. A computer-readable non-transitory storage medium containing instructions for enabling a plurality of software components to communicate in a software component matrix environment, the instructions comprising instructions executable:
- to encode a request at a handler at a client side;
- to communicate the encoded request to a server at a server side via a communication interface; and
- to receive, via the communication interface, an encoded response comprising results of a function match, wherein the encoded response is mapped to a data model of a client at the client side.

19. The medium of claim 18, further instructions executable to cache the results of the function match.

* * * * *